(12) United States Patent
Helfman

(10) Patent No.: US 7,774,323 B2
(45) Date of Patent: Aug. 10, 2010

(54) METHOD AND APPARATUS FOR DELIVERING MANAGED APPLICATIONS TO REMOTE LOCATIONS

(75) Inventor: Nadav Binyamin Helfman, Binyamina (IL)

(73) Assignee: SAP Portals Israel Ltd., Ra'anana (IL)

( * ) Notice: Subject to any disclaimer, the term of this patent is extended or adjusted under 35 U.S.C. 154(b) by 253 days.

(21) Appl. No.: 11/389,890

(22) Filed: Mar. 27, 2006

(65) Prior Publication Data

US 2007/0226227 A1     Sep. 27, 2007

(51) Int. Cl.
*G06F 17/00*     (2006.01)
*G06F 15/16*     (2006.01)

(52) U.S. Cl. ........................ 707/694; 709/223; 709/217; 709/229; 725/105; 725/110

(58) Field of Classification Search ............... 707/104.1, 707/694; 709/223–226, 217, 229; 725/105, 725/110; 715/738
See application file for complete search history.

(56) References Cited

U.S. PATENT DOCUMENTS

| | | | |
|---|---|---|---|
| 5,606,317 A | 2/1997 | Cloonan et al. | |
| 5,640,563 A | 6/1997 | Carmon | |
| 6,038,593 A | 3/2000 | Huckins | |
| 6,115,384 A | 9/2000 | Parzych | |
| 6,230,160 B1 | 5/2001 | Chan et al. | |
| 6,259,443 B1 * | 7/2001 | Williams, Jr. ................ | 715/741 |
| 6,269,402 B1 | 7/2001 | Lin et al. | |
| 6,438,594 B1 * | 8/2002 | Bowman-Amuah ......... | 709/225 |
| 6,445,313 B2 | 9/2002 | Ahn | |
| 6,480,123 B2 | 11/2002 | Tsutsui et al. | |
| 6,539,425 B1 * | 3/2003 | Stevens et al. ............... | 709/220 |
| 6,587,876 B1 * | 7/2003 | Mahon et al. ................ | 709/223 |
| 6,917,976 B1 * | 7/2005 | Slaughter et al. ............ | 709/226 |
| 6,948,183 B1 * | 9/2005 | Peterka ......................... | 725/25 |
| 6,986,018 B2 * | 1/2006 | O'Rourke et al. ........... | 711/213 |
| 7,228,556 B2 * | 6/2007 | Beach et al. .................. | 725/53 |
| 2001/0039565 A1 | 11/2001 | Gupta | |
| 2002/0116444 A1 * | 8/2002 | Chaudhri et al. ............ | 709/201 |
| 2002/0143948 A1 * | 10/2002 | Maher et al. ................. | 709/226 |
| 2002/0169858 A1 * | 11/2002 | Bellinger et al. ............ | 709/220 |

(Continued)

FOREIGN PATENT DOCUMENTS

| | | |
|---|---|---|
| EP | 07006179 | 3/1996 |
| WO | WO 99/67886 | 12/1999 |

OTHER PUBLICATIONS

Andy McFadden Hacking Data Compression Lesson 1 Introduction, Internet Article Oct. 30, 2002—XP002379865.

(Continued)

*Primary Examiner*—Tony Mahmoudi
*Assistant Examiner*—Dennis Truong
(74) *Attorney, Agent, or Firm*—Buckley, Maschoff & Talwalkar LLC

(57) ABSTRACT

An apparatus for delivering managed services to remote locations, the apparatus comprising a delivery policy, and a repository containing pairs of executables and pairs of configurations intended for delivery platforms and for remote appliances. The apparatus further comprises a delivery platform, responsible for delivering the executables and the configurations to one or more servers and one or more remote appliances.

23 Claims, 3 Drawing Sheets

U.S. PATENT DOCUMENTS

| | | |
|---|---|---|
| 2002/0188568 A1* | 12/2002 | Nickolaisen et al. .......... 705/52 |
| 2003/0037026 A1* | 2/2003 | Bantz et al. .................... 707/1 |
| 2004/0031056 A1* | 2/2004 | Wolff ......................... 725/110 |
| 2004/0039803 A1* | 2/2004 | Law ........................... 709/223 |
| 2004/0117426 A1* | 6/2004 | Rudkin et al. ............... 709/200 |
| 2005/0216942 A1* | 9/2005 | Barton ........................ 725/97 |
| 2006/0026162 A1* | 2/2006 | Salmonsen et al. ............ 707/10 |
| 2006/0184967 A1* | 8/2006 | Maynard et al. .............. 725/46 |

OTHER PUBLICATIONS

M Nelson LZW Data Compression—Dr. Dobb's Journal, M&T published Redwood City, CA, US, Oct. 1989.

Microsoft Technet—Overview of Deploying a Managed Environment Process—Mar. 28, 2003 http://technet2.microsoft.com/WindowsServer/en/library/4a05be6b-09fd-444f-ac6f-c2292f4931961033.mspx?pf=true.

* cited by examiner

METHOD AND APPARATUS FOR DELIVERING MANAGED APPLICATIONS TO REMOTE LOCATIONS

RELATED APPLICATIONS

The present invention relates to International patent application serial number PCT/IL02/00991, titled APPARATUS AND METHOD FOR OPTIMIZED AND SECURED REFLECTION OF NETWORK SERVICES TO REMOTE LOCATIONS, filed on Dec. 9, 2002, the entire content thereof is herein incorporated by reference.

BACKGROUND OF THE INVENTION

1. Field of the Invention

The present invention relates to a method and apparatus for implementing a hybrid approach towards consolidation or distributing computer applications in general, and to unified deployment and management of applications in remote locations, in particular.

2. Discussion of the Related Art

Continuous innovation in the information technology (IT) industry creates varying trends of distribution and consolidation of IT infrastructure and application. When mainly mainframe computing platforms were used, the ruling approach was consolidation. Later, when personal computers became more available, the approach changed towards distribution, which changed back towards consolidation with the increase in number of computers employed within an organization. The tendencies towards a more consolidated or a more distributed approach stem from contradicting considerations and requirements. Quality of service (QoS) considerations usually suggest taking a more distributed approach, wherein the performance experienced by a user of an application does not depend on communication with a remote computer. However, total cost of ownership (TCO) considerations suggest higher degree of consolidation, wherein operations such as installation, updates, backups, or the like are carried out in a single location, thus requiring less time and manpower resources. In current technologies, both the distributed and the consolidated approaches rely heavily on Wide Area Networks (WAN) for deployment and usage of applications by remote users. Traditional networking vendors such as CISCO Systems, Inc. from California developed the Application Oriented Networking (AON) technology which operate as a set of distributed application and network services that span business, security, administrative, and network domains. On the other hand, application infrastructure products, such as IBM WebSphere Edge Server V2.0 for Multiplatforms, manufactured by IBM Corporation from New York distributes application processing to the edge of the network under centralized administrative and application control. Yet another prior art approach suggests the usage of a pair of executables, wherein one executable represents a pure virtual reflected service, while the other represents a consumed service. However, this approach does not enable the activation of any application-aware computational process in the remote locations, i.e. a remote location is not provided with any knowledge regarding the application. Therefore, every application transaction requires a round trip comprising a query and a response to a server, which is usually physically placed in a data center.

There is therefore a need in the art for a comprehensive solution that will utilize capabilities both in application building and deployment and in networking and will optimize the distributed and the consolidated approaches, thus providing enhanced quality of service as well as enhanced performance for applications and services used by multiple remote users. The solution should also supply single management and deployment for services which are provided by multiple executables in multiple locations.

SUMMARY OF THE PRESENT INVENTION

It is an object of the present invention to provide a novel apparatus and method for implementing a hybrid approach between consolidation and distribution of computer applications while using a unified deployment and management policy.

In accordance with a preferred embodiment, there is thus provided an apparatus for managing delivery of one or more managed services supplied by one or more servers to one or more remote appliances, the apparatus comprising: one or more delivery platforms for delivering one or more first resources related to the one or more managed services; one or more servers using the first resources related to the one or more managed services; one or more remote appliances using one or more second resources related to the at least one managed service; and one or more storage units, storing a delivery policy for the managed services and the first resources or the second resources associated with the managed service. Within the apparatus, the server and the delivery platform can be co-located on the same computing platform. Within the apparatus, the second resource can be delivered to the remote appliance by the server or by the delivery platform. The first or the second resources can be one or more executables or one or more configurations or user data. The first resource can be a server executable or a server configuration and the second resource can be a remote executable or a remote configuration. The delivery platform can further comprise a content delivery component for delivering one or more executables or one or more static resources to one or more servers or to one or more remote appliances. The remote appliance can be a cable converter or a software appliance. The remote appliance can be pre-installed. The remote appliance can comprise one or more points of service. The server can be an application server. The remote appliance can comprise one or more content receiving component. The remote appliance or the server can be installed with a version of an operating system, or they can comprise an optimizer component. The apparatus can further comprise a communication channel, the communication channel can be a wide area network.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
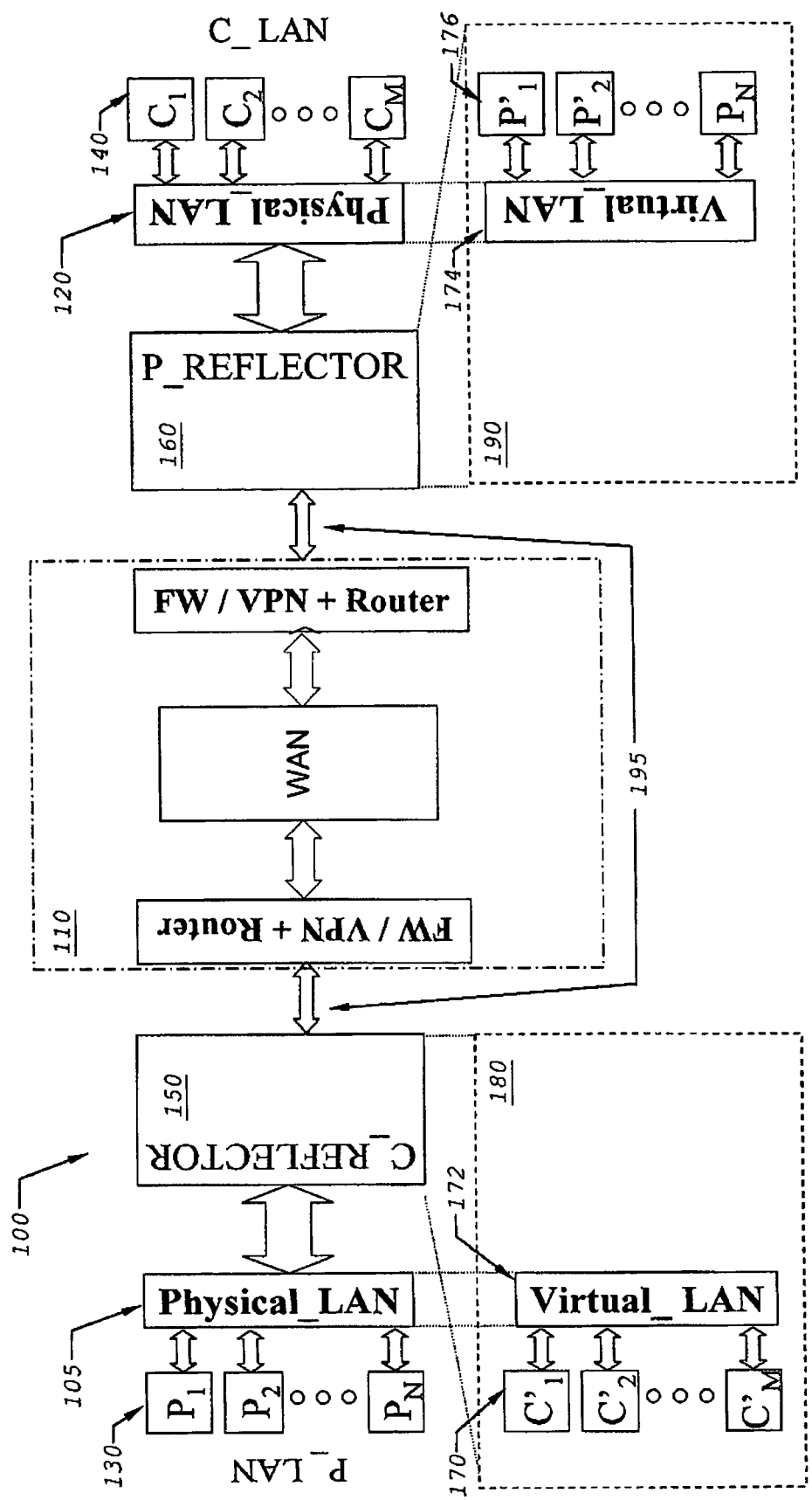
FIG. 1 is a block diagram of the prior art, showing the pure virtual network image approach for remote provisioning of consumption of services.

The present invention overcomes the disadvantages of the prior art by providing a novel method and apparatus for managing the provisioning of services from a server to one or more remote locations. The prior art disclosed a method and apparatus for optimized and secured reflection of network services in remote locations with multiple physical footprints and points of service in as many remote locations as required. In the context of the current invention, a footprint, also referred to as software footprint, is the physical presence of a computational activity required to provide a service. A software footprint on a computing platform can vary along the range stretching between a fully installed machine, which is computing platform, having the application fully installed so that no access to another part of the application installed on a different computing platform is required, and a software component running on a different computing platform and returning results to the computing platform. A computing platform can be a personal computer, a mainframe computer, or any other type of computing platform that is provisioned with a memory device and a CPU or microprocessor device. Alternatively, a computing platform can be a DSP chip, an ASIC device storing commands and data. The services themselves are supplied to remote locations by a delivery platform, responsible for delivering the remote side of an executable associated with an application to the remote location. The server side of the application is produced by an application server, i.e., the remote location accesses an application server at run time. Alternatively, the delivery platform itself can also function as an application server, and thus supply as well as produce the application. Delivery platform and applications servers are typically located at data centers, being a geographical location in which multiple servers are located, taken care of by skilled personnel, and providing services to multiple distributed remote locations and users. The services are preferably consumed from remote appliances, so that a pair of executable objects is used for each service. The installation, maintenance and monitoring of services is performed on a per-service basis. The current invention adds a storage unit which stores a unified policy and unified repository. The repository contains producer-consumer pairs of executable components, pairs of configurations, unified policy, and a repository for user data associated with the services, to be used as a persistency device. The component provides centralized deployment, monitoring and maintenance control for the services, according to a policy and to required configurations. Thus, the invention implements a hybrid approach, wherein the total cost of ownership is as low as in a consolidated approach since no access to remote locations is required, while the quality of service and performance are like those expected in a distributed approach. The quality of service and performance are improved due to the reduced communication volume required between a delivery platform and a remote appliance, and the reduced number of round trips due to the ability to answer a subset of the application level requests locally on a remote appliance. In the disclosed invention, preferably no committed persistency is allowed in a remote location, so any remote device can be replaced without data loss.

Referring now to FIG. 1, showing a prior art approach which uses virtual reflected services vs. delivered services. When using this approach, a remote user consumes services through a reflection of a consumer in the producer site and a reflection of the producer in the consumer site, as described in International patent application serial number PCT/IL02/00991. A service producer 130 is connected to a local area network 105 at the physical site of producer 130. The server provides a service to a service consumer 140, which is connected to a local area network 120. A producer reflector device 160 is physically connected to LAN 120, and produces a reflected producer network image 176 of service producer 130. Similarly, a consumer reflector device 150 is physically connected to LAN 105, and produces a reflected consumer network image 170 of service consumer 140. Consumer reflector device 150 is physically connected to the LAN 105. According to the same policy, consumer reflector creates in producer LAN virtual network images of service consumers from consumer LAN. a reflected network image 170 connects the service producer 130 on behalf of the actual service consumer 140 from consumer LAN. The producer reflector 160 and the consumer reflector devices connect with each other over WAN 110 using a network channel 195, which is optimized as described in the following sections.

Figure 2:
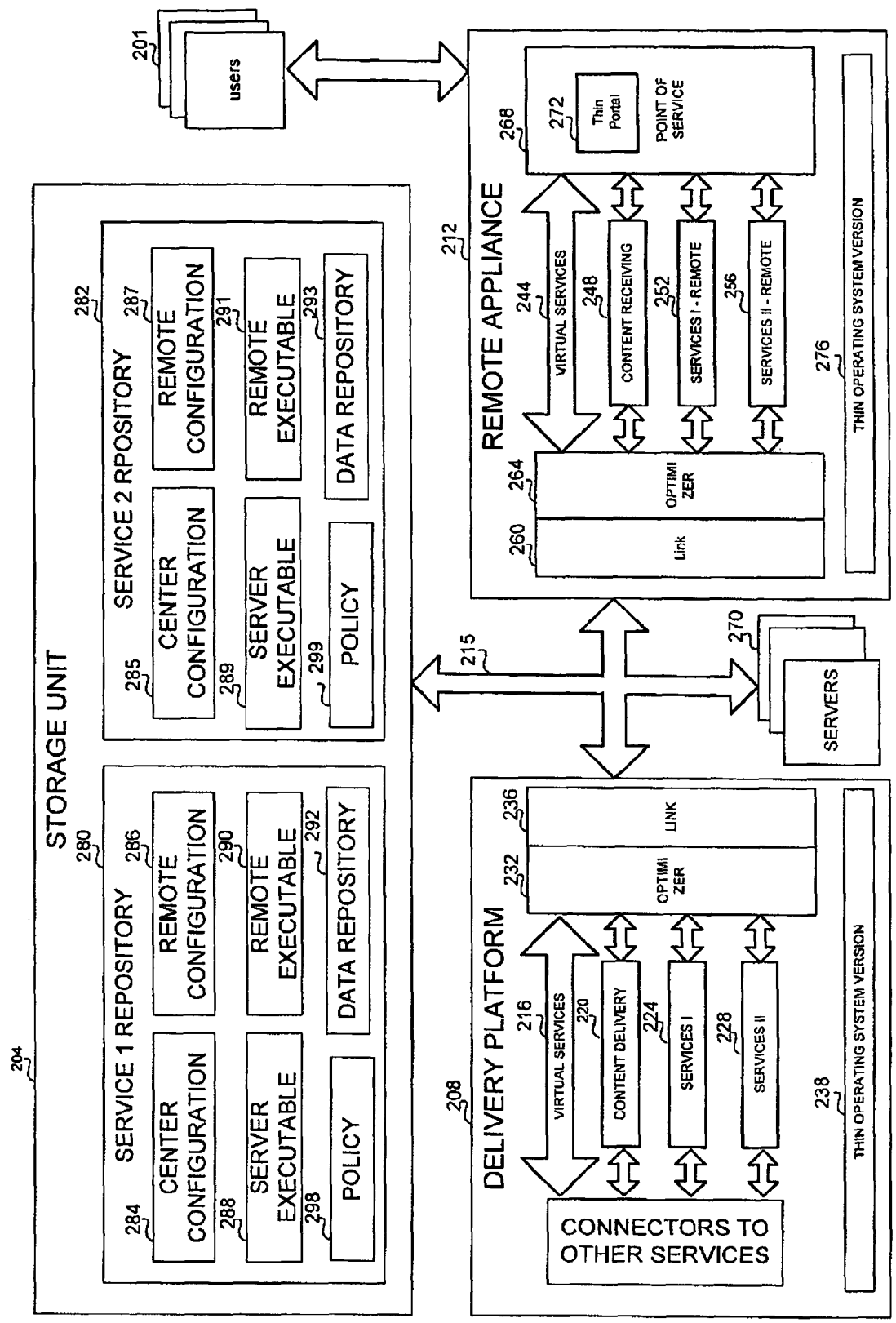
FIG. 2 is a block diagram showing the main components of an apparatus, in accordance with a preferred embodiment of the disclosed invention.

Referring now to FIG. 2, showing a block diagram of the main components of an apparatus, in accordance with a preferred embodiment of the disclosed invention. The apparatus comprises a singular storage unit 204 storing information, including an overall policy for a multiplicity of services. Storage unit 204 is singular, since it provides an overall policy and delivery-related storage for all users of all services, regardless of their geographic location or any other factor. No other element can change or affect the policy stored in storage unit 204. Each service is to be used by a multiplicity of users 201 who can be located in one or more geographical locations. Each user 201 connects to on one or more remote appliances 212, such as a computing platform or a set top box. Each remote appliance 212 runs a client side executable component of one or more services. Storage unit 204 connects to one or more delivery platforms 208. Delivery platform 208 connects to one or more servers 270, such as application servers, running the server side executable component of one or more services. Delivery platform 208 is responsible for delivering client or server executable components to servers 270 or remote appliances 212, respectively, according to the policy stored at storage unit 204. Typically, an organization employs a single delivery platform for all supplied services and between a few and thousands of remote appliances, which will receive the executables or other resources form the delivery platform. This approach provides advantages associated with the consolidated approach, wherein all delivery operations are performed form a single location. Alternatively, an organization can employ two or more delivery platforms, wherein each delivery platforms delivers different services, or where two or more delivery platforms deliver a single service or a group of services, for example for purposes such as disaster recovery. Servers 270 provision the updated versions of the executable component implementing the client side of one or more services to remote appliances 212. Alternatively, delivery platform 208 provisions the updated client side of the services to remote appliances 212. In yet another alternative, delivery platform 208 also functions as server 270, so delivery platform 208 and server 270 are co-located on the same computing platform, which supplies the client side of the services to remote appliances 212. Therefore service 1 (224), services 2 (228) can be located on a server 270 or on delivery platform 208. Components 204, 208, 212, 270 are preferably computing platforms, such as mainframe computers, personal computers, network computers or any other computing platforms, provisioned with a CPU and storage device (not shown). All components of the apparatus preferably communicate through communication channel 215, such as Wide Area Network (WAN), Local Area Network (LAN), wireless communication or the like. In a typical environment, an organization will employ a singular storage unit, a singular delivery platform and a multiplicity of remote appliances. In an alternative implementation, the organization will employ more than a single platform, for purposes such as disaster recovery. Storage unit 204 preferably comprises a storage device, such as a magnetic tape, a magnetic disc, an optical disc, a laser disc, a mass-storage device, or the like. For each service, a pair of executable objects and a pair of configurations are maintained, wherein the first object, being the server executable, is designed to run on a server using the first configuration, which is the server configuration, and a second object, being the remote executable is designed to run on the remote appliance using the second configuration, i.e. the remote configuration. Storage unit 204 is responsible for storing the correct or updated versions of executables objects, configurations, and delivery-related data, relating to delivering executables or other resources to users. Optionally, application-related user data, including backups and additional tasks can also be stored at storage unit 204. Delivery platform 208 is responsible for delivering the objects and the configurations to server 270 (or to the relevant locations in the delivery platform itself) and possibly to remote appliances 212 according to the appropriate policy as set by the server and remote configurations. Storage unit 204 comprises a repository for each service, such as service 1 repository 280, service 2 repository 282 and others. Service 1 repository 280 comprises a pair of configurations, server configuration 284 and remote configuration 286. Service 1 repository 280 further comprises a pair of executable components, being server executable 288 and remote executable 290, intended to run on delivery platform 208 and remote appliance 212, respectively. Service 1 repository 280 comprises also data repository 292 designed to supply persistency and hold user data for all users using service 1. Alternatively, user data can also be stored on one or more servers 270. However, preferably no irreplaceable user data is stored on any remote appliance 212, so that any appliance 212 can be replaced with no loss of data. Corresponding items are stored for all other services offered for one or more users, for example service 2 repository 282, comprising server configuration 285, remote configuration 287, server executable 289, remote executable 291 and data repository 293, serving as a persistency devices for users of service 2. Policy storage 298 stores for each service the service type and the address of the host, and the locations at which the service will be supplied. The policy optionally comprises also the users or user types that will be able to use the service (optionally the users definition is per location), and properties such as access level, service level, security level, or the like, which can also be defined per location. For example, a HTTP service can be supplied by a certain host, and provide an interactive level service to all users at the London back office, and a batch level service to users having administrator privileges, at a Paris back office. In an alternative embodiment, policy storages 298, 299, and policies associated with additional services are implemented as a single stored entity, such as a database table, responsible for all relevant services. Each policy storage such as 298 or 299 is unique, and is not repeated on other components of the system, so that conflicts can not occur. Delivery platform 208 comprises a content delivery component 220, and one or more services 224, 228. Content delivery component 220 is responsible for delivering content stored on service 1 repository 280, service 2 repository 282 or the like, to one or more remote appliances 212. The content can include one or more executable components or one or more static resources such as data files. For example, Service 1 implemented by elements 224 and 252 may be an enterprise self training application which includes presentations, media clips, interactive questionnaire, administrative framework or the like. Presentations and media clips are static content that shall be delivered via the content delivery service. The interactive questionnaire and the administrative forms will be delivered through cooperation between the client and server executables while the remote executable can answer a subset of the user requests locally while addressing the server executable—which can access delivery platform resources for others. Another example relates to services 224 and 252, or alternatively to services 228 and 256, and can be, for example a delivery pair for a business application having one or more software clients that access a large collection of web services. Service 224 detects business transactions, which are actually a sequence of requests sent by remote service 252 running on remote appliance 212 to different web services, and based on the application's specific data service 224 predicts the next requests in the sequence, fetches answers and transmits one or more request and response pairs to remote service 252 which can then serve a client locally if a future request is identical to a predicted request, the next requests in the business transaction sequence of requests. In another example, services 224 and 252, or alternatively services 228 and 256 can be for example, a delivery pair for a multi-variable data interactive navigation application. Based on requests generated by remote service 256, a data model is generated by service 228 and delivered to remote service 256 which projects the data according to the user's requirements. Each remote appliance 212 comprises a content receiving component 248 which receives static content or files from content delivery component 220, and one or more remote services 252, 256 corresponding to services 224, 228. Alternatively, content receiving component 248 receives static content or files from server 270. Services 224, 228, 252 and 256 are installed, based on policy 298 or 299. Delivery platform 208 further comprises virtual services delivery 216, corresponding to remote virtual services 244 on remote appliance 212. The combination of virtual services delivery 216 and remote virtual services 244 is a generalization of the remote consumption of services approach detailed in association with FIG. 1 above. Components 216, 220, 224, 228 communicate with corresponding components 244, 248, 252, 256 through communication channel 215, preferably a Wide Area Network. Information going from delivery platform 208 to remote appliance 212 preferably goes through optimizer 232 designed to compress the information in order to reduce the transferred volume and link 236, and then through link 260 and optimizer 264 designed to decompress the transferred data, on the remote side. It will be appreciated that information going in the other way around goes through the same components in the reverse order. The usage of optimizers 232 and 264 is similar to the optimization performed in the Application Delivery over WAN (ADoW) approach disclosed in International patent application serial number PCT/IL02/00991, titled APPARATUS AND METHOD FOR OPTIMIZED AND SECURED REFLECTION OF NETWORK SERVICES TO REMOTE LOCATIONS, filed on Dec. 9, 2002. Both delivery platform 208 and remote appliance 212 comprise a thin, secured, tailored version of an operating system 238 on delivery platform 208, and 276 on remote soft appliance 212, such as Linux based soft appliance. Remote appliance 212 comprises a point of service component 268 with response-time monitoring and security. While some services are directly exposed to the user, some are exposed via a navigational graphic user interface of a preferably thin portal 272 which preferably has limited capabilities, such as Web Services for Remote Portlets (WSRP) iView and URL iView capabilities. When user 201 starts remote appliance 212, point of service component 268 starts, and loads the services available to the user. Upon control commands 202 arriving from application server 100, virtual service 116 of FIG. 1 of delivery platform 108 of FIG. 1 communicates with virtual service 244 of remote appliance 268 and uploads to remote appliance a new or updated service, or updates the information, such that a certain service is enabled by thin portal 272 to user 204. Remote appliance 212 can be a software appliance, in which case a standard bare PC or another computing platform is turned into an appliance managed by a singular delivery platform, through installing thin, secured, tailored version of the operating system, such as Linux. All such appliances are preferably managed During the installation, only the network address of the delivery platform and a unique identifier of the instance of the service installed on the delivery platform are required. In the case of a software appliance, no maintenance task is required. In the case of a malfunction, the appliance is replaced with an alternative appliance. The task of constructing the software appliance can be also used by system integrators and hosted services vendors. Embedded PC vendors can manufacture a line of installed appliances, which can be packaged similarly to a set top box which can be controlled by a remote or local controller or through the use of a connection to a computing service. Another implementation for remote appliance 212 is a software agent installed on a desktop operating system. For a roaming user or a smart client scenario, an installed desktop application delivers the required services from the delivery platform. Yet another implementation is a "partners platform", i.e., a software component installed on equipment of other vendors. A possible example is the CISCO AON remote office router. Storage unit 204 is responsible for delivering the correct or updated versions of executables objects to delivery platform 208 and remote appliance 212 according to the appropriate policy as set by the server and remote configurations, and for keeping the user data, including backup and additional tasks. It will be appreciated by a person skilled in the art that multiple delivery platforms 208 may reside on the same computing platform, and that central unit 204 can also reside on the same computing platform as one or more delivery platforms.

Figure 3:
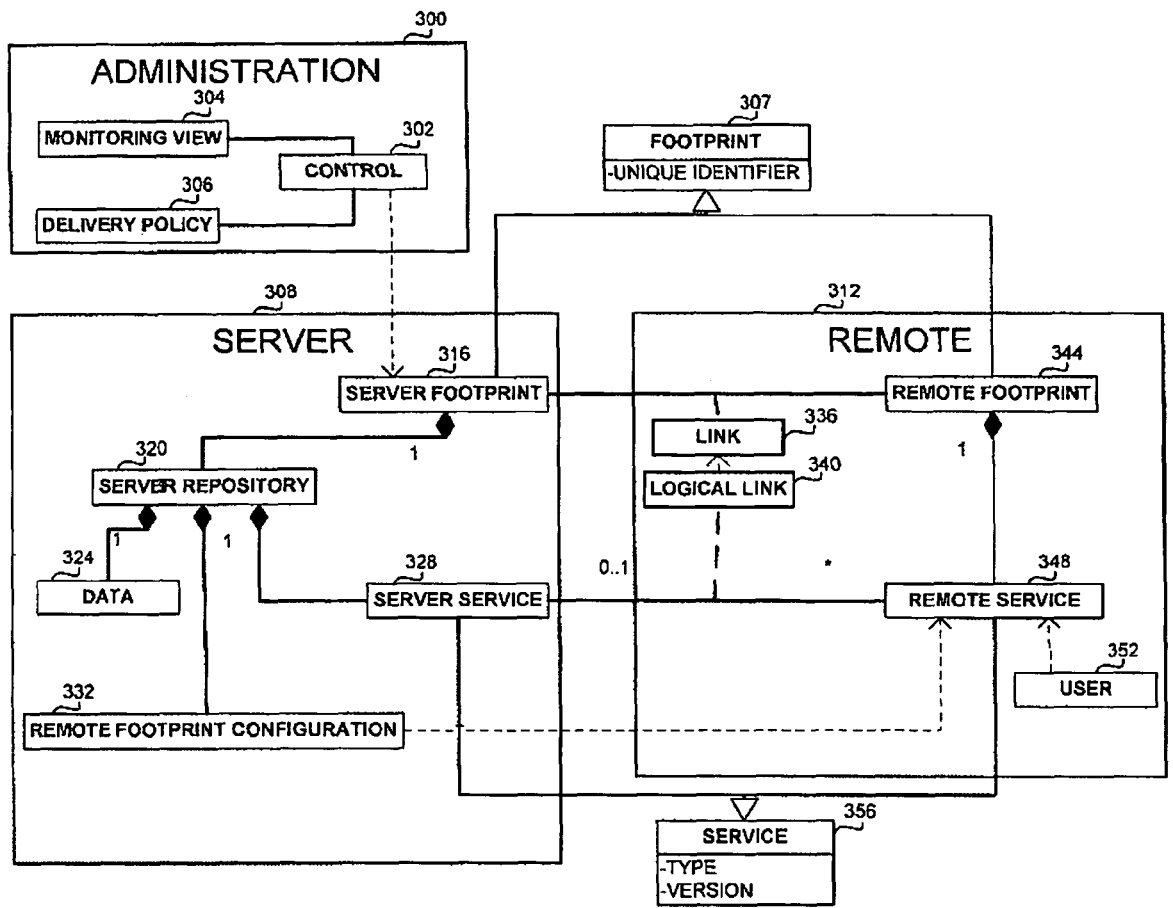
FIG. 3 is a class diagram of the pattern used in accordance with a preferred embodiment of the disclosed invention.

Referring now to FIG. 3, showing a Unified Modeling Language (UML) class diagram of a pattern representing a multi-footprint service. The pattern shown in the diagram can be implemented in any object-oriented language, such as C++, C#, Java or others, and in any environment, such as .Net or the like. For clarity purposes, the following discussion relates to objects implementing classes participating in the diagram rather than to the classes themselves. The objects participating in the pattern are generally distributed into three groups, administration objects 300, server objects 308 and remote objects 312. Server objects are usually created and run on the central platform, administration objects are created on an administration platform, wherein the administration platform can be a dedicated platform or the same as central platform. Remote objects are created and run on each remote platform, and for each remote footprint of one or more services. Administration objects comprise a single control object 302, which controls the availability of services to each remote platform 312. Control object 302 is associated by reference, containing, or another association mechanism with a monitoring view object 304, responsible for monitoring the status and performance of the services supplied to users. Control object 302 is further associated with a delivery policy object 306, which controls the policy according to which services are made available to users. The data associated with delivery policy object 306 is stored as policy 298 or 299 of FIG. 2. Server objects 308 comprise a central footprint object 316, which communicates with control object 302. Central footprint object 316 comprises one or more central repositories 320. The data associated with central repositories 320 is stored within data repository 393 or 293 of FIG. 2. Each central repository 320 comprises one or more data objects 324, one or more remote footprints configuration objects 332, and one or more central service objects 328. Each central service object 328 is associated with a specific service, such as 224 or 228 of FIG. 2. Remote objects 312 are created and run on each remote platform accessed by users. Each central footprint object 316 of server objects 308 is associated with one or more remote footprints objects 344, and each central service object 328 is associated with one or more remote service objects 348. Central service object 328 is instantiated as one or more platform services such as 224 or 228 of FIG. 2, and remote service object 348 is instantiated as one or more remote services such as 252 or 256 of FIG. 2. Each remote footprint object 344 comprises one or more remote service objects 348, one object per each service. An object representing a user 352 is associated with remote service 348, wherein the user is consuming the relevant service. Both central service 328 and remote service 348 inherit from a common service object or type, comprising a service type and a service version of a specific service. Similarly, both central footprint object 316 and remote footprint object 344 inherit from a footprint object or type comprising a unique identifier.

The disclosed apparatus, comprising central control, deployment and repository and a multi-footprint provides a multi-user environment with qualities which are generally viewed as contradicting, being a low total cost of ownership on one end, and high quality of service on the other end. The invention can be utilized in a dedicated machine, such as a cable converter, wherein the options available for each user are controlled and exposed according to a policy by a central policy-implementing unit. Installs and updates are also centrally controlled, and relevant versions are therefore delivered only when the central policy so dictates. This arrangement enables the manufacturing of a pre-installed units, which are instantly usable without further installations, but also provide the flexibility of changing the policy and upgrading components.

It will be appreciated by persons skilled in the art that the present invention is not limited to what has been particularly shown and described hereinabove. Rather the scope of the present invention is defined only by the claims which follow.

I claim:

1. An apparatus for managing delivery of an at least one managed service supplied by an at least one server to an at least one remote appliance, the apparatus comprising:

a first computing platform executing an at least one delivery platform for delivering the at least one managed service in accordance with a unified delivery policy;

a second computing platform executing an at least one server using an at least one first resource related to the at least one managed service, the second computing platform to arrange for the at least one first resource to use a first configuration derived from the unified delivery policy;

an at least one remote appliance using an at least one second resource related to the at least one managed service, the remote appliance to arrange for the at least one second resource to use a second configuration derived from the unified delivery policy; and an at least one storage unit for storing the unified delivery policy for the at least one managed service and the first resource or the second resource associated with the at least one managed service, wherein all of deployment, maintenance and monitoring control for the at least one managed service are provided by the delivery platform, in accordance with the unified delivery policy; and wherein the managed service comprises provisioning a business application that requires an executable, and the managed service is supplied by the first resource to the second resource, and wherein the storage unit stores server-appliance pairs of executable components, server-appliance pairs of configurations, and the single unified delivery policy, and no committed persistency associated with managed services is provided at the at least one remote appliance.

2. The apparatus of claim 1 wherein the second computing platform is the first computing platform.

3. The apparatus of claim 1 wherein the server delivers the at least one second resource to the at least one remote appliance.

4. The apparatus of claim 1 wherein the delivery platform delivers the at least one second resource to the at least one remote appliance.

5. The apparatus of claim 1 wherein the at least one first resource is a first executable and the second resource is a second executable, and wherein the first executable and the second executable are required for the managed service.

6. The apparatus of claim 5 wherein the first resource is a server executable and the second resource is a remote executable.

7. The apparatus of claim 1 wherein the at least one first resource or the at least one second resource is an at least one configuration.

8. The apparatus of claim 7 wherein the at least one first resource is a server configuration and the at least one second resource is a remote configuration.

9. The apparatus of claim 1 wherein the at least one first resource or the at least one second resource is user data.

10. The apparatus of claim 1 wherein the delivery platform further comprises a content delivery component for delivering an at least one executable or an at least one static resource to an at least one server or to an at least one remote appliance.

11. The apparatus of claim 1 wherein the remote appliance is a cable converter.

12. The apparatus of claim 1 wherein the at least one remote appliance comprises an at least one point of service components.

13. The apparatus of claim 1 wherein the at least one server is an at least one application server.

14. The apparatus of claim 1 wherein the at least one remote appliance comprises an at least one content receiving component.

15. The apparatus of claim 1 wherein the at least one remote appliance or the at least one server are installed with a version of an operating system.

16. The apparatus of claim 1 wherein the at least one remote appliance or the at least one server comprise an optimizer component.

17. The apparatus of claim 1 further comprising a communication channel.

18. The apparatus of claim 17 wherein the communication channel is a wide area network.

19. The apparatus of claim 1 wherein the at least one second resource resides within the at least one remote appliance.

20. The apparatus of claim 1 wherein at least a portion of the at least one first resource or at least a portion of the at least one second resource is an executable.

21. A method of managing delivery of an at least one managed service supplied by an at least one server to an at least one remote appliance through a delivery platform, the method comprising:

obtaining an at least one first resource related to the at least one managed service at the at least one server, the at least one first resource using a first configuration derived from a unified delivery policy;

obtaining an at least one second resource related to the at least one managed service at the at least one remote appliance, the at least one second resource using a second configuration derived from the unified delivery policy;

delivering the at least one managed service by the at least one server to the at least one remote appliance through the delivery platform; and determining the type and amount of the at least one second resource and the at least one first resource, wherein all of deployment, maintenance and monitoring communication between the at least one server and the at least one remote appliance for the at least one managed service are provided by the delivery platform in accordance with the unified delivery policy, and wherein the managed service comprises provisioning a business application that requires an executable, and the managed service is supplied by the first resource to the second resource in accordance with the delivery policy, and wherein a service repository stores server-appliance pairs of executable components, server-appliance pairs of configurations, and the single unified delivery policy, and no committed persistency associated with managed services is provided at the at least one remote appliance.

22. The method according to claim 21, further comprising a step of optimizing the type and amount of the at least one second resource and the at least one first resource, in accordance with the unified delivery policy.

23. The method according to claim 21, wherein at least a portion of the at least one second resource and the at least one first resource is an executable.

* * * * *